United States Patent [19]

Habeck et al.

[11] 4,037,016
[45] July 19, 1977

[54] ADHESIVE COMPOSITION

[75] Inventors: Bruce W. Habeck, Cuyahoga Falls; George W. Feeney, Akron, both of Ohio

[73] Assignee: The Goodyear Tire & Rubber Company, Akron, Ohio

[21] Appl. No.: 666,736

[22] Filed: Mar. 15, 1976

Related U.S. Application Data

[63] Continuation-in-part of Ser. No. 552,687, March 14, 1975, abandoned.

[51] Int. Cl.$^2$ .......................... C08K 5/01; C08L 7/00; C08L 53/02; C09J 7/02
[52] U.S. Cl. ..................................... 428/349; 260/5; 260/33.6 A; 260/33.6 AQ; 260/876 B; 260/888; 260/889; 428/355; 428/483; 428/521; 428/523; 526/339; 427/207 B
[58] Field of Search ................. 260/33.6 AQ, 33.6 A, 260/5, 888, 876 B, 4 AR, 889; 526/339; 428/349, 521

[56] References Cited

U.S. PATENT DOCUMENTS

| | | | |
|---|---|---|---|
| 3,509,239 | 4/1970 | Tindall | 260/888 |
| 3,846,352 | 11/1974 | Bullard et al. | 260/888 |
| 3,880,953 | 4/1975 | Downey | 260/888 |

Primary Examiner—Donald E. Czaja
Assistant Examiner—H. H. Fletcher
Attorney, Agent, or Firm—F. W. Brunner; H. C. Young, Jr.

[57] ABSTRACT

An adhesive composite which comprises an admixture of at least one of natural rubber and synthetic rubbers with a tackifying resin containing carbon-to-carbon unsaturation therein prepared by reacting in the presence of an aliphatic solvent and a catalyst selected from aluminum chloride and ethyl aluminum dichloride a monomer mixture comprised of about 60 to about 75 weight percent of a selected diolefin/olefin mixture and correspondingly about 40 to about 25 weight percent α-methyl styrene. Said adhesive composite has particular utility for use as a pressure sensitive adhesive.

10 Claims, No Drawings

ADHESIVE COMPOSITION

The application is a continuation-in-part of application Ser. No. 552,687 filed Nov. 14, 1975 now abandoned.

The invention relates to tackified elastomers and to methods for their preparation. While the invention is not restricted thereto, it has particular reference to pressure-sensitive adhesives.

Various adhesives can advantageously be used as pressure-sensitive, laminating and hot melt adhesives. Most are generally known for their ability to form bonded laminated articles and some are more particularly known as pressure-sensitive adhesives and some as hot melt adhesives.

Heretofore, adhesive compositions have been prepared, for example, by mixing natural rubber or rubbery unvulcanized block copolymers, derived from polymerized isoprene and polymerized styrene blocks, with tackifying resins, for example, derived from diolefin/olefin mixtures such as those primarily characterized by a principal backbone of piperylene and 2-methyl-2-butene.

However, such resins are substantially inadequate for effectively enhancing the tack of 1,3-butadiene/styrene aqueous emulsion copolymerized elastomers and block copolymers. Although the mechanism is not thoroughly understood, such backboned resins apparently require a balance of compatability with the butadiene/styrene copolymers to achieve maximum tack enhancement. Simply increasing the 2-methyl-2-butene, or decreasing the piperylene, content of the backbone has been found to be insufficiently effective.

Therefore, it is an object of this invention to provide tackified elastomers and tackified elastomers having adhesive properties.

In accordance with this invention, it has been discovered that an adhesive composition comprises a mixture of (1) about 100 parts by weight of a rubber primarily selected from at least one of natural rubber and synthetic rubber selected from cis-1,4-polyisporene, cis-1,4-polybutadiene, butyl rubber, ethylene/propylene/nonconjugated diene rubber, aqueous emulsion copolymerized 1,3-butadiene and styrene, and an unvulcanized elastomeric block copolymer having the general configuration A - B - A wherein each A is an independently selected nonelastomeric styrene polymer block having an average molecular weight of about 2,000 to about 100,000 and a glass transition temperature above about 25° C, the total block A content being from about 10 to about 50 percent by weight of the copolymer, and B is an elastomeric conjugated diene polymer block selected from 1,3 -butadiene and isoprene having an average molecular weight from about 25,000 to about 1,000,000 and a glass transition temperature below about 10° C, and copolymer having a tensile strength at 25° C in excess of about 200 pounds per square inch, and (2) about 60 to about 140 parts by weight of a compatible, thermoplastic tackifying resin containing carbon-to-carbon unsaturation therein prepared by the method which comprises reacting in the presence of a aliphatic hydrocarbon solvent and a catalyst selected from aluminum chloride and ethyl aluminum dichloride, a monomer mixture comprised of 60 to about 75 weight percent of a diolefin/olefin mixture of a weight ratio in the range of about 0.6/1 to about 1.4/1 and, correspondingly, about 40 to about 25 weight percent α-methyl styrene, where said diolefin comprises at least about 95 weight percent piperylene and up to about 5 weight percent isoprene based on the diolefin, and where said olefin comprises at least one olefin selected from 2-methyl-2-butene, 2-methyl-1-butene, 2-methyl-2-pentene and 2-methyl-1-pentene, preferably at least about 90 weight percent 2-methyl-2-butene, based on the olefin.

In further practice of this invention, in order to provide effective enhancement of the tack by the α-methyl styrene, it is often desired, that as the amount of α-methyl styrene increases, the diolefin/olefin ratio increases. Thus, for example, as α-methyl styrene increases from 25 percent to 40 percent, the diolefin/olefin ratio can correspondingly increase about 0.6/1 to about 1.4/1. In this regard, it is preferred that the amount of α-methyl styrene ranges from about 30 to about 40 weight percent and the diolefin/olefin ratio correspondingly ranges from about 1/1 to about 1.4/1.

The thermoplastic tackifying resins for the adhesive of this invention can be characterized generally by having a softening point in the range of about 60° C to about 80° C according to ASTM Method E 28-58 T, although they can typically have a softening point of about 70° C to about 80° C with vigorous steam stripping to remove low molecular weight materials including dimers, trimers and tetramers. The resins typically have good heat stability, a specific gravity at about 0.85 to about 1.0, an acid number at less than about 1.0 and a Gardner color in the range of about 4 to about 10.

Adhesive compositions of this invention can conveniently be prepared by mixing the tackifying resin with the rubber in the presence of volatile organic hydrocarbon solvents at various temperatures such as from about 0° C to about 100° C and typically from about 20° C to about 60° C but above the freezing point of the mixture and below its boiling point. Various aliphatic and aromatic hydrocarbons can be used or selected as effective solvents for the desired rubber. Representative examples of such aromatic hydrocarbons are toluene and benzene and representative examples of aliphatic hydrocarbons are pentane, hexane, heptane and octane. A particularly suitable hydrocarbon solvent is a mixture containing from about 10 to about 90 parts of toluene and correspondingly from about 90 to about 10 parts of hexane. This adhesive mixture is then suitable for bonding substrates such as by simply applying it to the substrate surfaces, drying it, and contacting the said substrate surfaces with the adhesive mixture therebetween and drying the said adhesive.

The mixture has particular utility as a pressure-sensitive adhesive. For example, pressure-sensitive tapes can easily be prepared by applying the solution of the adhesive mixture to a flexible substrate and drying the mixture. The adhesive of this invention also has utility as a hot melt pressure-sensitive adhesive, particularly when prepared by mixing the elastomeric block copolymer, the hydrocarbon tackifying resin and a minor amount of an oil such as a petroleum derived or coal tar derived oil or with liquid or low softening point resins. Particularly suitable is mineral oil. The hot melt adhesive is simply applied by heating the mixture, applying it to a substrate and cooling. After cooling, it is conveniently found that the adhesive has good pressure-sensitive properties.

In the preparation of the adhesives of this invention, it is understood that minor amounts of various antioxidants and fillers can be added and mixed therewith in order to further improve its aging characteristics and various physical properties.

The compatible tackifying resin required for the admixture of this invention is prepared by reacting the manipulated monomers in the presence of an aliphatic solvent, and aluminum chloride or ethyl aluminum dichloride, at a temperature in the range of about 0° C to about 100° C, preferably in the range of about 10° C to about 50° C. The reaction can be conducted batch-wise or as a continuous process. The reaction can be conducted at atmospheric pressure or above or below atmospheric pressure. Generally, the autogenous pressure developed by the reaction can be used.

Representative of various aliphatic solvents are saturated hydrocarbons containing 3 to about 8 carbon atoms, representative of which are n-butane, isobutane, n-pentane, isopentane, n-hexane, isohexane, n-heptane and isoheptane. Hexane and heptane are preferred. It is understood that unreacted hydrocarbons in the polymerization mixture can also act as a solvent. Generally sufficient solvent is used to provide a solution containing 70 weight percent monomers or resin, although higher or lower concentrations can usually be used.

Generally the reaction can be conducted over a period of time in the range of about 30 to about 120 minutes, although shorter or longer times can be used.

The resin is generally recovered by deactivating the catalyst with a material selected from an alcohol, such as methanol, isopropanol and butanol and/or lime, filtering the product and steam stripping the filtrate to remove volatiles. Then the resin can be mixed with the elastomer as a tackifier.

The tackifying resin can be modified by the addition of up to about 15, preferably up to about 10, weight percent of piperylene dimers or piperylene trimers or other unsaturated hydrocarbons, particularly hydrocarbons containing from 4 to 6, preferably 5 to 6, carbon atoms to the monomer mixture. Representative examples of such reactive hydrocarbons, in addition to 2-methyl-2-butene, are 2-methyl-1-butene, 2,3-dimethyl-1-butene, 2,3-dimethyl-2-butene, 2-methyl-1-pentene, 2-methyl-2-pentene, cyclopentene and 1,3-cyclopentadiene. Various other, essentially unreactive, unsaturated hydrocarbons can be present such as 1-pentene, 2-pentene, 3-methyl-2-pentene, 4-methyl-1-pentene, 3-methyl-2-pentene, 4-methyl-2-pentene, 2-hexene, 3,3-dimethyl-1-butene and cyclohexene.

The resins for the adhesives of this invention can typically be further characterized by being generally soluble in aliphatic hydrocarbons such as pentane, hexane and heptane and in aromatic hydrocarbons such as benzene and toluene. It is to be understood that these resins can have their composition modified, while maintaining their characterizations, by containing up to about 15 weight percent derived from the said piperylene dimers, piperylene trimers and other unsaturated hydrocarbons containing from 4 to 6, preferably 5 to 6, carbon atoms based on the total resin.

In the practice of this invention, adhesives and tackified admixtures can conveniently be prepared by mixing the piperylene/olefin/α-methyl styrene backboned resin with various elastomers, particularly 1,3-butadiene/styrene aqueous emulsion copolymerized elastomers, as well as natural rubber cis-1,4-polyisoprene, cis-1,4-polybutadiene and selected block copolymers.

Generally the tackifying resin is mixed with the elastomer in an amount of about 60 to about 140 parts by weight tackifying resin, based on 100 parts by weight elastomer. If desired, the mixture can conveniently be formed by dry mixing the tackifying resin and elastomer on a mixing mill or Banbury or by mixing in the presence of a volatile organic hydrocarbon solvent such as toluene, benzene, hexane, heptane and octane.

The resin of this invention has been found to be particularly useful for mixing with and enhancing the tack of elastomers prepared by free radical, aqueous emulsion copolymerizing a mixture of 1,3-butadiene and styrene. Particularly representative of such copolymers are those containing about 60 to about 95 weight percent units derived from 1,3-butadiene, and, correspondingly, about 40 to about 5 weight percent units derived from styrene.

Such elastomers can conveniently be prepared by conventional emulsion copolymerization, followed by coagulation and drying.

The block copolymers can conveniently be prepared by first polymerizing styrene with a lithium based initiator. Various lithium based initiators can be used such as, for example, lithium metal, alkyl lithium compounds, lithium hydrocarbyls and organolithium amides. Alkyl lithium compounds are preferred. Particularly preferred are branched chain, preferably secondary, alkyl lithiums. Such alkyl lithiums especially include secondary butyl lithium, isobutyl lithium, isoamyl lithium and secondary amyl lithium.

After polymerizing styrene to an average molecular weight of about 5,000 to about 30,000, the isoprene, or 1,3-butadiene, as the diene monomer and additional amounts of styrene are added to the polymerization mixture. The polymerization is then continued to provide an elastomeric non-conjugated diene polymer block followed by a non-elastomer block polymer of the styrene.

Such a polymerization, to form the block copolymer, is generally conducted at a temperature in the range of about 20° C to about 65° C in an inert hydrocarbon solvent such as an aliphatic or aromatic hydrocarbon.

The practice of this invention is more fully illustrated by reference to the following examples which are intended to be representative rather than limiting of the scope of the invention. Unless otherwise indicated, all parts and percentages are by weight.

EXAMPLE I

A series of experiments were conducted, identified herein as Experiments A to H and HH. In these experiments, various amounts of piperylene (PIP) and 2-methyl-2-butene (2MB2), along with heptane, were charged to reactors. Additionally, various amounts of α-methyl styrene along with aluminum trichloride were also charged to the reactors. The polymerization reactions were conducted at temperatures in the range of about 25° C to about 30° C for about 120 minutes. After this time, the catalyst was neutralized, or deactivated, with methanol and lime. The resin was simply recovered by filtering the product and steam distilling the filtrate to remove volatiles.

The results of Experiments A to H, including tack analysis with butadiene/styrene rubber, using 50 parts per resin per 50 parts free radical, aqueous emulsion copolymerized butadiene/styrene elastomer (SBR) are more clearly shown in the following Table 1. Note that the resin made with similar pip/2MB2 ratios with no α-methyl styrene impart no effective tack to SBR, as is more clearly demonstrated in Experiment HH.

TABLE 1

| Exp | Monomer Ratio PIP/2MB2 | % alpha-methyl styrene[1] | Resin Softening Point (° C)[2] | Tack (Rolling Ball) |
|---|---|---|---|---|
| A | 0.8 | 28 | 74 | 1.9 |
| B | 1.2 | 28 | 79 | 25 |
| C | 0.6 | 33 | 69 | 1.2 |
| D | 1.0 | 35 | 70 | 2.1 |
| E | 1.0 | 35 | 72.5 | 1.4 |
| F | 1.4 | 34 | 78 | 6.5 |
| G | 0.8 | 40 | 72 | 1.8 |
| H | 1.2 | 40 | 76 | 2.2 |
| HH | 1.0 | 0 | 99 | No tack |

[1]Based on the total of piperylene, 2-methyl-2-butene and α-methyl styrene
[2]Softening point of resin according to ASTM E 28-58 T.

It should be pointed out that the polymerization mixture did contain some few additional hydrocarbons, in addition to the basis piperylene/2-methyl-2-butene/α-methyl styrene, as is more clearly shown in Table 2.

TABLE 2

(Piperylene/2-methyl-2-butene ratio = 1.3)

| Compound | Percent by weight |
|---|---|
| t-2-pentene | 9.78 |
| c-2-pentene | 12.00 |
| 2-methyl-2-butene | 20.16 |
| isoprene | .84 |
| cyclopentene | 3.46 |
| 1-t-3-pentadiene | 20.51 |
| 1-c-3-pentadiene | 5.82 |
| α-methyl styrene | 26.00 |
| other $C_5$'s and $C_6$'s | 1.43 |

EXAMPLE II

Pressure-sensitive adhesives were prepared by mixing 20 parts of a resin prepared according to the method of Example I, 20 parts of an unvulcanized block copolymer of 1,3-butadiene or isoprene and styrene and 60 parts of toluene at 25° C. The pressure sensitive adhesives are identified herein as Experiments I-K. Experiment K is a control using no tackifying resin. After the rubber and resin dissolved in the toluene, a one mil coating was spread on a polyester (polyethylene terephthalate) film. The coating was dried and the coating film laminate cut into test strips. The adhesive properties of the coating were tested utilizing methods of the Pressure Sensitive Tape Council, PSTC-6 for tack, and PSTC-1 for peel. The following results were obtained as shown in Table 3, indicating superior pressure sensitive adhesive properties.

TABLE 3

| Exp | % α-methyl styrene in basic resin | Tack (inches) | 180° peel (oz/inch) | Dynamic Sheer (psi) |
|---|---|---|---|---|
| I2 | 15 | 5½ | 50 | 34 |
| J2 | 20 | 1½ | 40 | 31 |
| K1 | — | 3¾ | 66 | 35 |

1,2 Unvulcanized block copolymers obtained as (1) Kraton 1107 or (2) Kraton 1101, trademarks of The Shell Chemical Company, as containing about 86 percent isoprene (1) or 70 percent butadiene (2) and correspondingly about 14 or 30 percent styrene by weight, a glass transition temperature of about −70° C and a tensile strength of about 1200 pounds per square inch with an elongation of about 1300 percent measured at 25° C and an intrinsic viscosity of 1.1 as measured in toluene at 30° C.

In this example, the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Illinois. This test measures the average pull value required to peel the adhesive from the substrate at 180° angle in pounds per one inch width of the test sample. The PSTC-6 test involves measuring the distance a ball rolls across a horizontally positioned pressure sensitive sample after rolling down a prepared inclined plane. The dynamic sheer strength was measured in this example by pulling a ½ square inch of tape from steel panel at a rate of 2 inches/min.

In the further practice of this invention, the adhesive composition can be adaptively applied as a hot melt, particularly when about 10 to about 40 parts by weight of a rubber processing-type oil is added to the composition, by applying the composition, as a hot melt, at about 140° C to about 190° C to a substrate, itself at a temperature of about 15° C to about 50° C, where the hot melt sets up on the substrate and transforms into a pressure-sensitive adhesive within about 10, preferably within about 5, seconds. In this aspect of the invention, it is important to appreciate that the hot melt is applied in the absence of the solvent, in contradistinction to the solvent application for ordinary pressure sensitive adhesives, thereby enabling an essentially solvent-free method of preparing a pressure-sensitive adhesive coated substrate. In this regard, various rubber processing oils can be used, representative of which include, although are not limited to, mineral oil and naphthenic oils and other compatible oils generally used in the rubber processing art. Although it is conceivable that a hot melt be applied with the composition of this invention itself, it is generally desired that the rubber processing oils be added to aid in the initial fluidity of the hot melt and to enable a more efficient coating procedure.

In the description of this invention, it has been related that the adhesive mixture can be comprised of various rubbery materials, which include butyl rubber and EPDM. In this regard, as is well known to those having skill in the rubber art, butyl rubber is typically an elastomeric copolymer of isobutylene and isoprene and EPDM is typically a terpolymer of ethylene, propylene and a minor amount, typically in the range of about 5 to about 15 weight percent, of a non-conjugated diene. Typical non-conjugated dienes are dicyclopentadiene, ethylidene bicycloheptene and 1,4-hexadiene. Generally in such EPDM's the amounts of units derived from ethylene ranges from about 20 to about 80 percent and the amount of units derived from propylene also ranges from about 20 to about 80 percent.

While certain representative embodiments and details have been shown for the purpose of illustrating the invention, it will be apparent to those having skill in this art that various modifications and changes may be made therein without departing from the spirit or scope of the invention.

What is claimed is:

1. An adhesive composition prepared by mixing in the presence of a volatile organic solvent selected from at least one of the group consisting of toluene, benzene, pentane, hexane, heptane and octane, as well as unreacted hydrocarbons, (1) about 100 parts by weight of a rubber primarily selected from at least one of a natural rubber and synthetic rubber selected from cis-1,4-polyisoprene, cis-1,4-polybutadiene, butyl rubber, ethylene/propylene/non-conjugated diene rubber, aqueous emulsion copolymerized 1,3-butadiene and styrene, and an unvulcanized elastomeric block copolymer having the general configuration A - B - A wherein each A is an independently selected nonelastomeric styrene polymer block having an average molecular weight of about 2,000 to about 100,000 and a glass transition temperature above about 25° C., the total block A content being from about 10 to about 50 percent by weight of the copolymer, and B is an elastomeric conjugated diene polymer block of a diene selected from 1,3-butadiene and isoprene having an average molecular weight from about 25,000 to about 1,000,000 and a glass transition temperature below about 10° C., said copolymer having a tensile strength at 25° C., in excess of about 200 pounds per square inch, and (2) about 60 to about 140 parts by weight of a compatible, thermoplastic tackifying resin containing carbon-to-carbon unsaturation therein and having a softening point in the range of about 60° C. to about 80° C. and drying the resulting composition, said tackifying resin being prepared by the method which comprises (A) reacting in the presence of an aliphatic hydrocarbon solvent and a catalyst selected from aluminum chloride and ethyl aluminum dichloride, a monomer mixture consisting of 60 to about 75 weight percent of a diolefin/olefin mixture of a weight ratio in the range of about 0.6/1 to about 1.4/1 and, correspondingly, about 40 to about 25 weight percent α-methyl styrene, where said diolefin consists of at least about 95 weight percent piperylene and up to about 5 weight percent isoprene based on the diolefin, and where said olefin comprises at least one olefin selected from 2-methyl-2-butene, 2-methyl-2-pentene and 2-methyl-1-pentene and (B) recovering the resin from the polymerization mixture by first neutralizing the catalyst with a material selected from water, lime and at least one alcohol selected from methanol, isopropanol and butanol, followed by stream stripping the filtrate thereof to remove volatiles.

2. The adhesive composition of claim 1 where the diolefin/olefin ratio of said resin increases in accordance with any increase in the amount of α-methyl styrene.

3. The adhesive composition of claim 1 where the diolefin/olefin weight ratio of said resin ranges from about 1/1 to about 1.4/1, the α-methyl styrene is used in an amount of about 30 to about 40 weight percent, and where said olefin is comprised of at least about 90 weight percent 2-methyl-2-butene.

4. The adhesive composition of claim 1 where, in said resin, said piperylene/2-methyl-2-butene/α-methyl styrene backbone monomers are modified by containing up to about 15 weight percent other unsaturated hydrocarbons containing 5 to 6 carbons.

5. The adhesive composition of claim 5 where, for said resin, said solvent is selected from hexane, heptane and unreacted hydrocarbons and the polymerization is conducted at a temperature in the range of about 10° C. to about 50° C.

6. The adhesive composition of claim 5 prepared by (a) mixing said tackifying resin with at least one of said elastomers in the presence of a volatile organic solvent selected from toluene, benzene, hexane, heptene and octane, (b) applying a coating of said mixture to a substrate surface, (c) drying said coat and (d) contacting substrate surfaces with said coat therebetween.

7. The adhesive composition of claim 5 where said elastomer is comprised primarily of at least one rubber selected from an elastomer of aqueous emulsin free radical copolymerized 1,3-butadiene and styrene; a block copolymer of sytrene/isoprene/styrene, and a block copolymer of styrene/butadiene/styrene.

8. The adhesive composition of claim 7, as a hot melt pressure sensitive adhesive, in admixture with about 10 to about 40 parts by weight of a rubber processing-type oil.

9. The adhesive composition of claim 8, where said oil is primarily comprised of at least one of naphthenic oils and mineral oil and is applied to a substrate as a hot melt at a temperature in the range of about 140° C. to about 190° C., the substrate itself being at a temperature in the range of about 15° to about 50° C., where said hot melt sets up on the substrate and transfers into a pressure sensitive adhesive within about ten seconds.

10. The adhesive composition of claim 1 where the diolefin/olefin weight ratio for the preparation of said resin ranges from about 1/1 to about 1.4/1 while the α-methyl styrene content is allowed to range from about 30 to about 40 weight percent, based on the total of diolefin, olefin and α-methyl styrene, where said olefin is comprised of at least about 90 weight percent 2-methyl-2-butene and correspondingly contains up to about 10 weight percent of at least one material selected from piperylene dimers, piperylene trimers and other unsaturated reactive hydrocarbons selected from 2-methyl-1-butene, 2,3-dimethyl-1-butene, 2-methyl-1-pentene, 2-methyl-2-pentene, cyclopentene and 1,3-cyclopentadiene.

* * * * *